INVENTOR.
FLOYD E. KNECHT

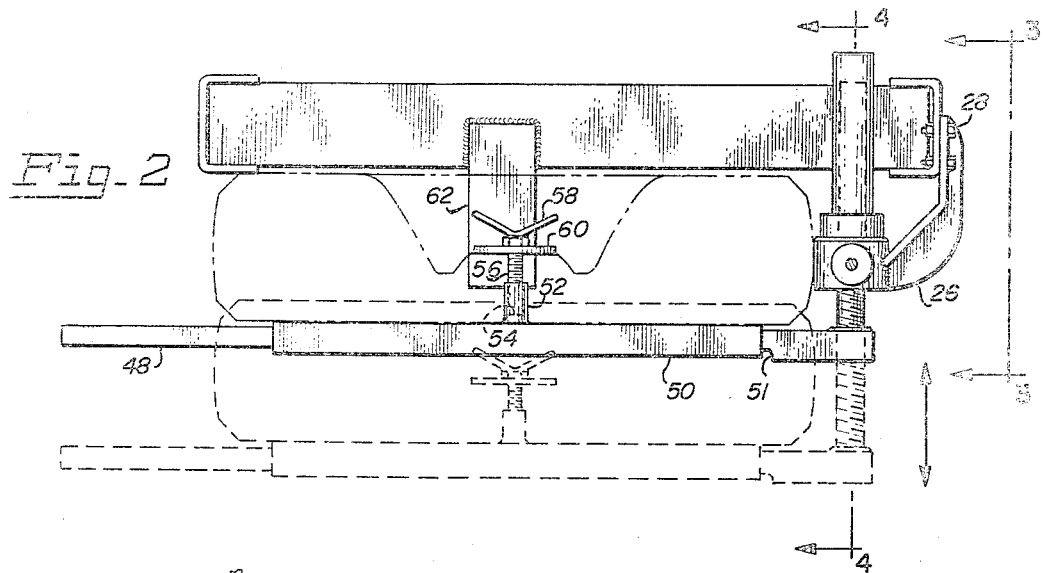
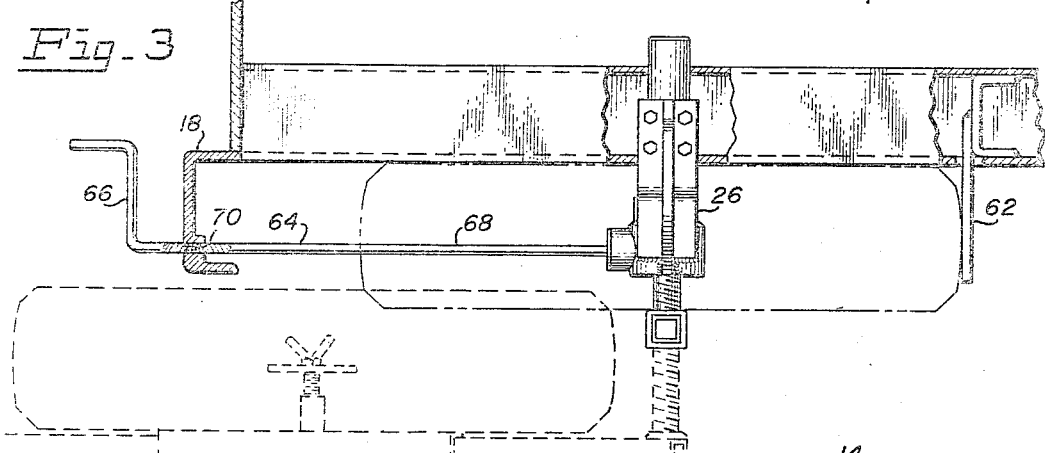
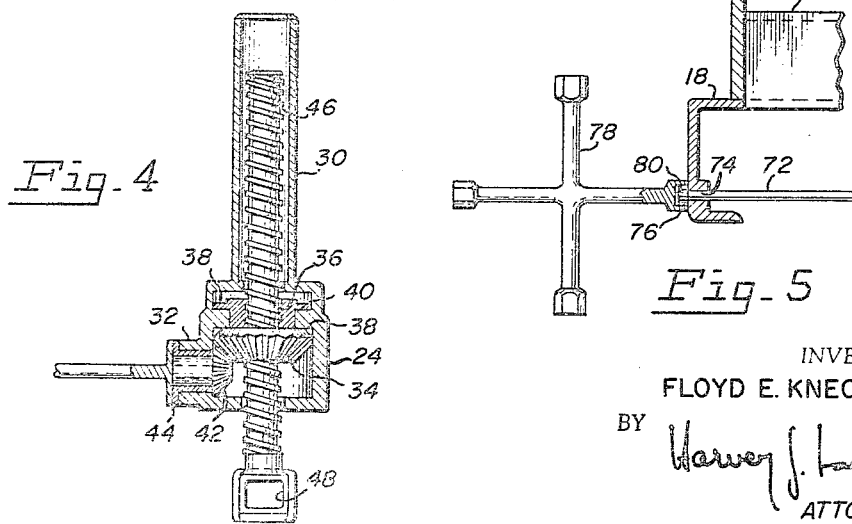

United States Patent Office 3,330,431
Patented July 11, 1967

3,330,431
MEANS FOR HANDLING A SPARE TIRE AND WHEEL OF A MOTOR VEHICLE
Floyd E. Knecht, 1611 Ardmore Ave., Modesto, Calif. 95350
Filed Oct. 13, 1965, Ser. No. 495,473
7 Claims. (Cl. 214—454)

This invention relates to a novel method and means for handling the spare tire and wheel in a motor vehicle. More particularly, but not by way of limitation, this invention relates to a method and means for storing the spare wheel and tire of a motor vehicle beneath the vehicle in a manner which permits a user to remove the tire and wheel from its stored position by only performing a simple movement at the end of the vehicle.

It is customary in the use of motor vehicles to carry in the vehicle a spare tire mounted on a spare wheel so that one of the tires contacting the ground may be replaced by the spare tire and wheel if the original tire loses its air pressure or become damaged during use. In automobiles and station wagons the spare tire and wheel are usually stored in the trunk and in some trucks the spare tire and wheel are bolted to the side of the truck in some suitable manner. However, bolting the spare tire and wheel to the side of the truck makes it easy to steal and since changes in the body styles of motor trucks have made it undesirable to secure the spare tire and wheel to the side of the truck, it is now desirable for the spare tire and wheel to be carried elsewhere in the truck. Thus, the spare tire and wheel for motor trucks are customarily suspended from the frame of the motor truck at a point beneath the load carrying bed of the truck by means of a tire holding bracket bolted to the frame.

This arrangement has proved to be highly unsatisfactory since it is necessary for removal of a tire that an operator crawl under the load carrying bed of the truck and remove the bolts securing the wheel carrying bracket to the frame of the truck while simultaneously supporting the spare tire and wheel. It is obvious that this is a highly undesirable procedure in good weather and is even more undesirable in inclement weather when the ground is wet and cold. It is also obvious that to secure the spare tire and wheel in its storage position is a difficult and strenuous operation and can only be performed by a properly attired sturdy workman.

Devices have been provided in the past for securing the spare tire and wheel of a motor vehicle in a manner which would eliminate the above difficulties. These devices have been customarily characterized by a windlass and cable arrangement whereby the spare tire could be attached to one end of a cable and then raised or lowered to or from its ordinary storage position. However, the devices have been so complex and expensive that the actual way of storing a spare tire and wheel in practice has remained the same, namely, the tire being suspended directly from the frame of the vehicle at a point beneath the load carrying bed of the vehicle. Thus, until the provision of the present invention the problem of efficiently and economically storing the spare tire and wheel of a motor vehicle has remained unsolved.

The present invention contemplates a novel means and method for handling the spare tire and wheel of a motor vehicle. This means includes a gear casing which is secured to the frame of the vehicle in a suitable manner, as by a bracket. The gear casing encloses a rotatably disposed first gear having a central threaded bore. A second gear is also rotatably disposed within the gear casing and meshes therewith for rotation in the same direction. A vertically disposed threaded rod or lead screw threadedly engages the threaded bore of the first gear and extends through the gear casing. A means is provided for securing the spare tire and wheel to the lead screw. This means may take the form of a horizontally extending member which is secured at one end to the lead screw and a member that is slidably disposed on the arm member and which is adapted to removably hold the spare tire and wheel. A crank means, which extends from the exterior of the vehicle, is connected to the second gear and a guide member is secured to the frame of the vehicle for horizontally positioning the spare tire and wheel.

A novel method handling the spare tire and wheel of a motor vehicle includes positioning the spare tire and wheel at the end of the vehicle and swinging the spare tire and wheel under the vehicle to a predetermined position, and then raising the tire and wheel to a secured horizontal position. This method may be accomplished by rotating the crank means in a first direction after the spare tire and wheel have been positioned at the end of the vehicle so that the spare tire and wheel are swung under the vehicle to a position determined by the guide member. Continued rotation will then cause the spare tire and wheel to raise to a horizontal stored position since further horizontal movement is precluded by the guide member.

This novel method may also include a lowering of the spare tire and wheel to a predetermined position and then swinging it from under the vehicle to a position at the end thereof for easy removal. This may be easily accomplished by rotating the crank means in an opposing direction so that the lead screw is moved downwardly and then when the spare tire and wheel clear the undercarriage and bumper of the vehicle then swinging it out to a position at the end of the vehicle which would permit it to be easily removed from its holding member.

Accordingly, it is an object of this invention to provide a novel method and means for safely and quickly securing a spare tire and wheel beneath a motor vehicle.

It is another object of this invention to provide a spare tire and wheel carrier which may be easily operated by a single operator.

Another object of the present invention is to provide a spare tire and wheel carrier having a sturdy structure of light weight.

Another object of this invention is to provide a spare tire and wheel carrier which is economical to construct and which has a long service.

Yet another object of this invention is to provide a method of facilitating the removal of a spare tire from a horizontal stored position beneath a motor vehicle.

Still another object of the present invention is to provide a spare tire and wheel carrier which is simple and uncomplicated in construction.

And still another object of this invention is to provide a novel spare tire and wheel carrier which may be readily adapted to any automotive vehicle chassis.

Another object of the present invention is to provide a spare tire and wheel carrier which permits removal of the spare tire and wheel without requiring the operator thereof to at any time crawl beneath the vehicle.

Still another object of this invention is to provide a novel carrier for a spare tire and wheel of a motor vehicle which may be easily operated by an operator with a minimum of effort.

And yet another object of the present invention is to provide a novel method of quickly and expeditiously handling a spare tire and wheel of a motor vehicle.

Further objects and advantages of the present invention will become apparent to those skilled in the art to which the invention pertains as the ensuing description proceeds.

The features of novelty that are considered characteristic of this invention are set forth with particularity in the appended claims. The organization and method of operation of the invention itself will best be understood from the following description when read in connection with the accompanying drawing in which:

FIGURE 2 is an end view of the spare tire and wheel carrier illustrated in FIGURE 1 and illustrates in dotted outline various positions which the spare tire and wheel may assume.

FIGURE 3 is a side view from line 3—3 of the spare tire and wheel carrier illustrated in FIGURE 2 and illustrates in dotted outline the various positions which the spare tire and wheel may assume.

FIGURE 4 is a fragmentary longitudinal section, on an enlarged scale, taken along line 4—4 of FIGURE 2.

FIGURE 5 is a fragmentary longitudinal section, on an enlarged scale, of a modification of this invention.

Figure 1:
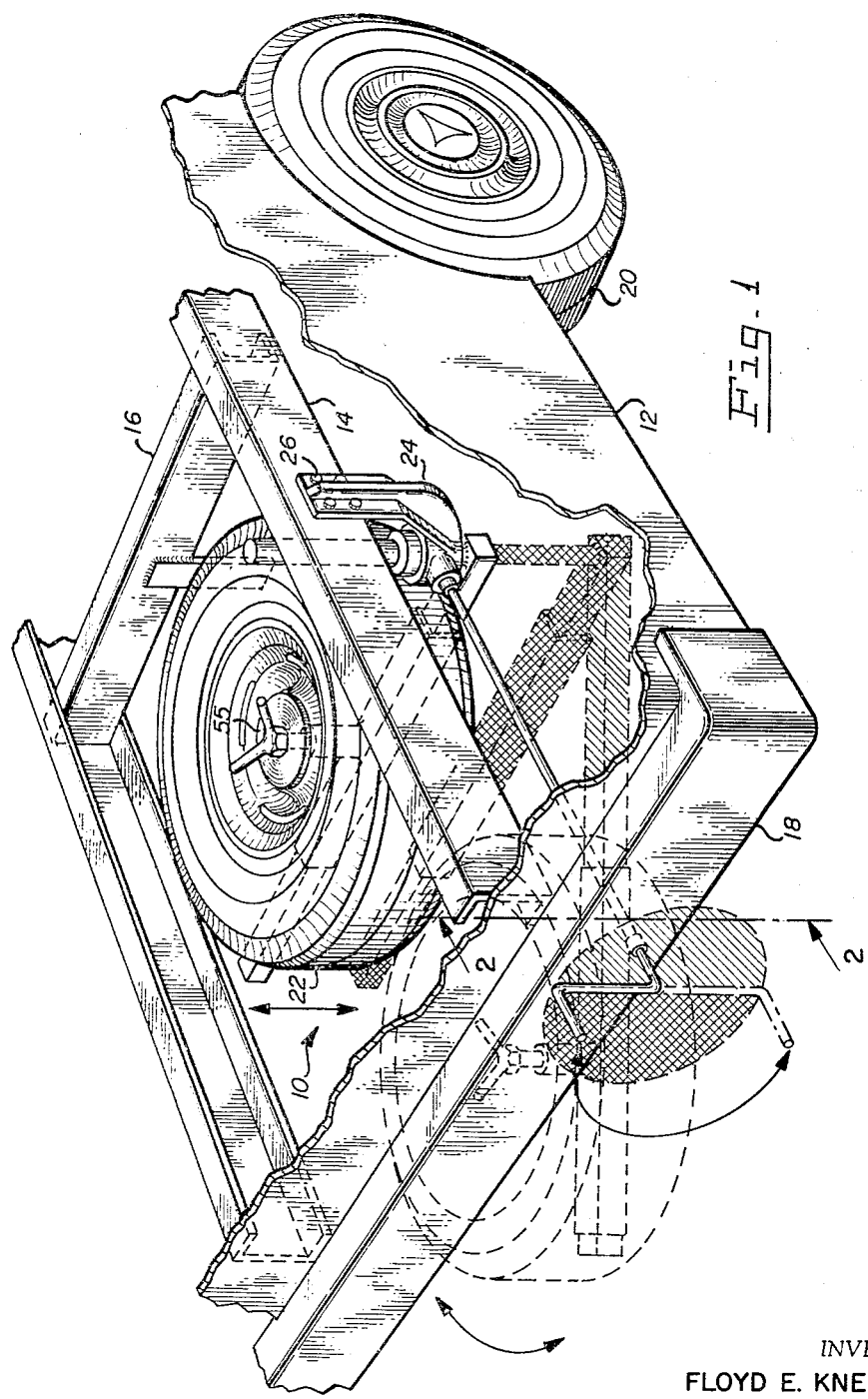
FIGURE 1 is a perspective view that is partially cut away and which illustrates a spare tire and wheel carrier embodying the invention as it appears when the tire and wheel are in a stored position and also illustrates in dotted outline an intermediate position of the carrier which is assumed prior to its final position at which the spare tire and wheel are to be removed.

Referring to the drawings in detail, and particularly FIGURE 1, reference character 10 generally designates one embodiment of a means for handling the spare tire and wheel of a vehicle 12 which has a frame 14 that includes a cross frame member 16. The vehicle 12 also has a bumper 18 positioned at the end of the vehicle and a plurality of wheels 20, only one of which is shown for ease of illustration. As is customary with motor vehicles, a spare tire and wheel 22 is provided for substitution for one of the wheels 20 if the need should arise.

A vertically disposed tubular gear casing 24, seen most clearly in FIGURE 4, is secured in a suitable manner, such as by a bracket 26 which may have the casing 24 welded to one end and secured at the other end to the frame 14 by a plurality of suitable bolts 28. The gear casing 24 is provided with a vertically extending closed tubular portion 30 and a horizontally extending tubular arm portion 32, the axis of which intersects the axis of the casing 24.

A first gear 34, a preferably of the bevel type and having a central threaded bore 36, is rotatably disposed within the gear casing 24. The gear 34 may be rotatably disposed within the casing 24 by outwardly extending shoulders 38 of the gear 34 cooperating with the inwardly extending shoulder 40 of the casing, but the particular arrangement illustrated is intended to be exemplary only and other arrangements of rotatably disposing the gear 34 within the casing 24 would also be within the scope of this invention.

A second gear 42, also preferably of the bevel type, is rotatably disposed within the arm portion 32 of the casing 24 and meshes or workingly engages the gear 34. The second gear 42 is preferably disposed within the arm portion 32 so that its axis intersects the axis of the first gear 34. The particular arrangement of rotatably disposing the second gear may include an annular ring member or washer 44 which is secured to the second gear 42 in a suitable manner such as by welding and cooperates with the arm portion 32 of the casing 24 to preclude horizontal movement therewithin.

A threaded rod or lead screw 46 vertically extends through the gear casing 24 and threadedly engages the threaded bore 36 of the first gear 34. The tubular member 30 preferably encloses the threaded screw 46 when it is in a fully vertically extended position so as to preclude water, mud, or other foreign fluids from contacting the threaded rod 46 or the gears 34 and 42.

A horizontally extending arm member 48, which preferably has a non-circular cross section, is connected at one end to the lower end of the threaded rod 46 in any suitable manner such as by welding.

An elongated hollow member 50 is slidably positioned on the arm member 48. The member 50 preferably has a cross-sectional configuration which cooperates with the cross-sectional configuration of the arm member 48 to preclude relative rotational movement therebetween. The member 50 is adapted to removably hold a spare tire and wheel 22. In the illustrated embodiment the member 50 is provided with a vertically extending member 52 having a central threaded bore 54 and adapted to extend through the central aperture 55 of the tire and wheel 22. A threaded bolt 56, having a wing nut 58 and washer 60 secured thereto, threadedly engages the member 52 for removably clamping the tire and wheel 22 to the member 50.

A downwardly extending guide member 62 in the form of a flat member is secured to the cross member 16 of the frame 14 of the vehicle 12.

A crank means 64 is secured to the second gear 42 in a suitable manner as by welding. In an illustrated embodiment of the invention the crank means takes the form of a crank handle 66 having an elongated portion 68 which extends through an aperture 70 in the bumper 18. It will be apparent that rotation of the crank handle in one direction will rotate the second gear 42 and in turn the meshed first gear 34. If the threaded rod 46 is not precluded from rotation, the rotation of the first gear 34 will also rotate the rod 46 and in turn the spare tire and wheel 22 which are operatively carried by the rod 46. If the rod 46 is precluded from rotating, then it will be apparent that rotation of the first gear 34 will cause the rod 46 to travel upwardly or downwardly within the gear casing 24 according to the direction of the rotation of the gear 34.

A modification of the present invention is disclosed in FIGURE 5 wherein like numerals designate like parts as in the other embodiment of the invention. It is also within the scope of this invention for the crank means 64 which is connected to the second gear 42 to comprise a shaft 72 which is connected at one end to the gear 42 and which, after passing through an aperture 74 in the bumper 18, has a nut-like shoulder 76 formed on its outer end similar to the nuts (not shown) which are normally used to secure an automobile wheel to a hub. The crank means would then include a conventional lug wrench 78 which is provided with a plurality of cavities 80 for receiving a nut. Thus, the lug wrench 78 may be stored in any convenient place and only positioned on the nut 76 when it is desired to store or remove the spare tire and wheel 22.

A novel method of handling a spare tire and wheel of a motor vehicle is utilized in the operation of the device 10. When it is desired to store the spare tire and wheel 22 of a motor vehicle 12, the spare tire and wheel 22 are horizontally positioned at the end of the vehicle and swung thereunder to a predetermined position. Thereafter, the spare tire and wheel 22 are raised to a horizontal stored position.

This is accomplished by initially securing the spare tire and wheel 22 to the member 50 by means of the nut and bolt arrangement clearly illustrated in FIGURES 1 and 2. The member 50 and spare tire and wheel 22 secured to it are then slid forward on the arm member 48 until the shoulder 51, formed on the arm member 48, is contacted by the member 50. The crank arm 66 is then rotated in a first direction and in turn rotates the meshed first and second gears 34 and 42. Because of friction between lead screw 46 and the first gear 34, the lead screw 46 together with the arm member 48, upon which the spare tire and wheel 22 are positioned, will rotate and swing under the motor vehicle 12 until the outer periphery of the wheel 22 contacts the guide member 62 thereby precluding further rotation. Continued rotation of the arm 66 will cause the rod 46, due to threaded engagement with the first gear 34, to move upwardly and in turn to carry the spare tire and wheel 22 upwardly.

Rotation of the arm 66 is discontinued when the spare tire and wheel 22 have moved upwardly into contact with the frame 14. The spare tire and wheel 22 are then securely positioned in a horizontal stored position beneath the motor vehicle 12 in an operation which did not require the operator to position himself upon the ground, but which was accomplished in an easy manner by simply rotating a crank arm at the exterior of the vehicle after the spare tire and wheel 22 were horizontally positioned on the arm member 50.

The novel method of handling a spare tire and wheel of a motor vehicle also includes removal thereof from its horizontal stored position when it is desired to replace a tire and wheel then contacting the ground. This is accomplished by lowering the spare tire and wheel 22 from its horizontal stored position until it clears the frame 14 and bumper 18 of the vehicle 12 at which position it will rotate to swing out to a desired position at the end of the vehicle 12 because of the friction between lead screw 46 and sleeve 34. In terms of an illustrated embodiment of the invention this involves rotating the crank arm 66 in a direction opposing the first direction. Rotation of the crank arm 66 will, through the rotation of the first and second gears 34 and 42, cause the spare tire and wheel 22 to first move downwardly until the spare tire becomes disengaged from frame 14 and then to swing horizontally while continuing its downwardly motion until coming into contact with bumper 18 which stops any further horizontal swing during the spare tire's continued downward motion. When the spare tire and wheel 22 have been moved downwardly a distance sufficient to clear the bumper 18, rotation of the crank arm 66 will then swing the tire and wheel 22 horizontally to a position at the end of the vehicle. The member 50 is then slid outwardly on the arm member 48 so that the nut and bolt arrangement may be released and the tire and wheel 22 removed from the member 50. It is thus apparent how the tire and wheel 22 have been removed from a horizontally stored position beneath a motor vehicle by only rotating a crank means, and thus avoiding the necessity of the operator positioning himself under the vehicle and removing the tire and wheel only after great labor has been expended.

From the foregoing, it is apparent that the novel invention provides a novel means and method for handling the spare tire and wheel of a motor vehicle in a manner which permits the removal of the tire and wheel from a stored position beneath the vehicle by only turning a crank at the exterior of the vehicle and does not require an operator to crawl beneath the vehicle to remove the spare tire and wheel with great difficulty. It is also apparent that the present invention provides a spare tire and wheel carrier which, due to its simplicity, is easy and economical to construct and which has a long service life. Similarly, the novel spare tire and wheel carrier has a sturdy and rugged construction of light weight and which may be easily operated by a single operator with a minimum of effort.

It is further apparent that the present invention provides a novel method for handling the spare tire and wheel in a manner which permits an operator to store a spare tire and wheel in a horizontal position beneath a motor vehicle by only turning a crank in a direction opposite to that direction which is utilized in removing the tire and wheel from its stored position.

Changes may be made in the combination and arrangement of parts or elements as heretofore set forth in the specification and shown in the drawings, it being understood that changes may be made in the precise embodiment disclosed without departing from the spirit and scope of the invention as defined in the following claims.

What is claimed is:
1. In a device for handling the spare tire of a motor vehicle:
   horizontally disposed and vertically movable bar means swingingly supported at one end thereof under the bed of a vehicle;
   means for removably supporting the spare tire upon said bar means;
   means for limiting the swinging displacement of said bar means, when supporting the spare tire, between a first position underneath the bed of the vehicle and a second position in which at least a portion of the spare tire projects outwardly from the bed of the vehicle; and
   means coupled to said bar means for simultaneously swinging and vertically moving said bar means, said means providing a first mode of operation whereby said bar means is both raised and urged to swing into said first position and a second mode of operation whereby said bar means is simultaneously lowered and urged to swing into said second position.

2. A device in accordance with claim 1 in which said bar means includes a threaded sleeve rotatably supported by the vehicle, a vertically disposed lead screw threadingly engaging said sleeve, and a horizontal bar having one end rigid with the lower end of said lead screw.

3. A spare tire and wheel carrier for an automotive vehicle comprising:
   a first gear rotatably carried by the frame of the vehicle and having a vertically extending threaded bore;
   a lead screw in threaded engagement with said first gear;
   a horizontally extending arm secured to the lower end of said lead screw;
   a member slidably received by said arm and adapted to removably hold a spare tire and wheel;
   a downwardly extending guide member secured to the frame of the vehicle and adapted to be contacted by the spare tire and wheel;
   a second gear in working engagement with said first gear; and
   crank means removably engageable with said second gear, whereby rotation of said crank means in one direction rotates said second gear to cause said threadedly engaged lead screw to first rotate the spare tire and wheel under the bed of the vehicle until engaging said guide member and thereafter raise the spare tire and wheel to a secured position in which it clampingly engages the frame of the vehicle, and rotation of said crank means in the opposing direction rotates said second gear to cause said threadingly engaged lead screw to first unclamp and lower the spare tire and wheel until clear of the frame of the vehicle and thereafter rotate the spare tire and wheel into a predetermined position at which ready access thereto can be had.

4. A spare tire and wheel carrier for an automotive vehicle comprising:
   a downwardly extending bracket secured to the frame of the vehicle;
   a vertically extending tubular casing secured to said bracket;
   a first gear rotatably disposed in said casing and having a vertically extending threaded bore;
   a lead screw in threaded engagement with said first gear and coaxially disposed with respect to said casing;
   a horizontally extending arm secured to the lower end of said lead screw;
   a member slidably received by said arm and adapted to removably hold a spare tire and wheel;
   a downwardly extending guide member secured to the frame of the vehicle and adapted to be contacted by the spare tire and wheel;

a second gear in working engagement with said first gear; and crank means removably engageable with said second gear whereby rotation of said crank means in one direction rotates said second gear to cause said threadedly engaged lead screw to first rotate the spare tire and wheel under the bed of the vehicle until engaging said guide member and thereafter raise the spare tire and wheel to a secured position in which it clampingly engages the frame of the vehicle, and rotation of said crank means in the opposing direction rotates said second gear to cause said threadingly engaged lead screw to first unclamp and lower the spare tire and wheel until clear of the frame of the vehicle and thereafter rotate the spare tire and wheel into a predetermined position at which ready access thereto can be had.

5. A spare tire and wheel handling device for an automotive vehicle for moving the spare tire and wheel between a stored position and a ready access position, said handling device comprising:

threaded sleeve means rotatably carried by the vehicle for rotation about a vertical axis;

lead screw means threadingly engaging said sleeve means;

sleeve actuating means coupled to said sleeve means to rotate said sleeve means;

crossbar means rigidly secured to and depending horizontally from the lower end portion of said lead screw means;

sleeve means for removably holding the spare tire and wheel, said sleeve means slidably engaging said crossbar means; and stop means carried by the vehicle for limiting any further rotation of said screw means after said spare tire and wheel are moved to the stored position, the sense of the thread of said sleeve means being selected such that the frictional torque between said sleeve means and said lead screw means rotates said crossbar means from the ready access position to the stored position when said sleeve actuating means rotates said sleeve means to raise said lead screw means, and rotates said crossbar means from the stored position to the ready access position when said sleeve actuating means rotates said sleeve means to lower said lead screw means.

6. A spare tire and wheel handling device for an automotive vehicle for moving the spare tire and wheel between a stored position and a ready access position, said handling device comprising:

threaded sleeve means rotatably carried by the vehicle for rotation about a vertical axis;

lead screw means threadingly engaging said sleeve means;

sleeve actuating means coupled to said sleeve means to rotate said sleeve means;

crossbar means rigidly secured to and depending horizontally from the lower end portion of said lead screw means, said crossbar means including means for removably holding the spare tire; and stop means carried by the vehicle for limiting any further rotation of said lead screw means after said spare tire and wheel reaches the stored position, the sense of the thread of said sleeve means being selected such that the frictional torque between said sleeve means and said lead screw means rotates said crossbar means from the access position to the stored position when said sleeve actuating means rotates said sleeve means to raise said lead screw means and rotates said crossbar means from the stored position to the access position when said sleeve actuating means rotates said sleeve means to lower said lead screw means.

7. A spare tire and wheel handling device for an automotive vehicle for moving the spare tire and wheel between a stored position and a ready access position, said handling device comprising:

threaded sleeve means rotatably carried by the vehicle for rotation about a vertical axis;

lead screw means threadingly engaging said sleeve means;

sleeve actuating means coupled to said sleeve means to rotate said sleeve means; and crossbar means rigidly secured to and depending horizontally from the lower end portion of said lead screw means, said crossbar means including means for removably holding the spare tire, the sense of the thread of said sleeve means being selected such that the frictional torque between said sleeve means and said lead screw means rotates said crossbar means from the access position to the stored position when said sleeve actuating means rotates said sleeve means to raise said lead screw means and rotates said crossbar means from the stored position to the access position when said sleeve actuating means rotates said sleeve means to lower said lead screw means.

References Cited

UNITED STATES PATENTS 2,325,848   8/1943   Gildea et al. _____ 214—451

FOREIGN PATENTS 749,561   5/1933   France.

HUGO O. SCHULZ, *Primary Examiner.*